US012764235B2

(12) United States Patent
Bernabe et al.

(10) Patent No.: US 12,764,235 B2
(45) Date of Patent: Oct. 13, 2026

(54) ON-NETWORK ROUTING FOR INTER-CARRIER CALLING

(71) Applicant: Zoom Communications, Inc., San Jose, CA (US)

(72) Inventors: William Thomas Bernabe, Northborough, MA (US); Benjamin Joseph DeStephen, Hilliard, OH (US); Donovan Patrick Leone, Bel Air, MD (US)

(73) Assignee: Zoom Communications, Inc., San Jose, CA (US)

( * ) Notice: Subject to any disclaimer, the term of this patent is extended or adjusted under 35 U.S.C. 154(b) by 853 days.

(21) Appl. No.: 17/855,287

(22) Filed: Jun. 30, 2022

(65) Prior Publication Data

US 2024/0007565 A1 Jan. 4, 2024

(51) Int. Cl.

*H04M 7/12* (2006.01)
*H04M 3/42* (2006.01)
*H04M 15/00* (2024.01)

(52) U.S. Cl.

CPC ....... *H04M 7/128* (2013.01); *H04M 3/42289* (2013.01); *H04M 15/49* (2013.01)

(58) Field of Classification Search

CPC ... H04M 7/128; H04M 3/42289; H04M 15/49
See application file for complete search history.

(56) References Cited

U.S. PATENT DOCUMENTS 6,636,504 B1 10/2003 Albers et al.
7,734,024 B1 * 6/2010 Croak ............... H04M 15/8044 379/112.01
8,416,769 B2 4/2013 Lewis
9,282,156 B2 3/2016 Holley et al.
9,674,001 B2 6/2017 Nix et al.
10,616,391 B2 4/2020 Backhaus et al.
2004/0141595 A1 7/2004 Crockett et al.
2006/0077956 A1 * 4/2006 Saksena ................ H04M 7/006 370/352
2010/0041365 A1 * 2/2010 Lott ...................... H04W 60/00 455/406
2016/0036991 A1 * 2/2016 Brewer ............... H04L 65/1069 370/356
2018/0331857 A1 11/2018 Nix et al.

FOREIGN PATENT DOCUMENTS

WO WO-2021034906 A1 * 2/2021 ......... H04B 7/18504

* cited by examiner

*Primary Examiner* — Moo Jeong
(74) *Attorney, Agent, or Firm* — Young Basile Hanlon & MacFarlane P.C

(57) ABSTRACT

A software platform supports multiple carriers, such as telephony carriers or public switched telephone network (PSTN) carriers, and routes calls between devices associated with different carriers without having to route the calls through the different carriers. The software platform establishes or maintains the calls between the devices associated with different carriers by transmitting a portion of call data associated with call record information to the respective carriers, and a portion of the call data associated with media and signaling information to the destination device.

20 Claims, 8 Drawing Sheets

ON-NETWORK ROUTING FOR INTER-CARRIER CALLING

FIELD

This disclosure generally relates to call routing, and, more specifically, call routing over a software platform between user devices associated with different public switched telephone network (PSTN) carriers.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
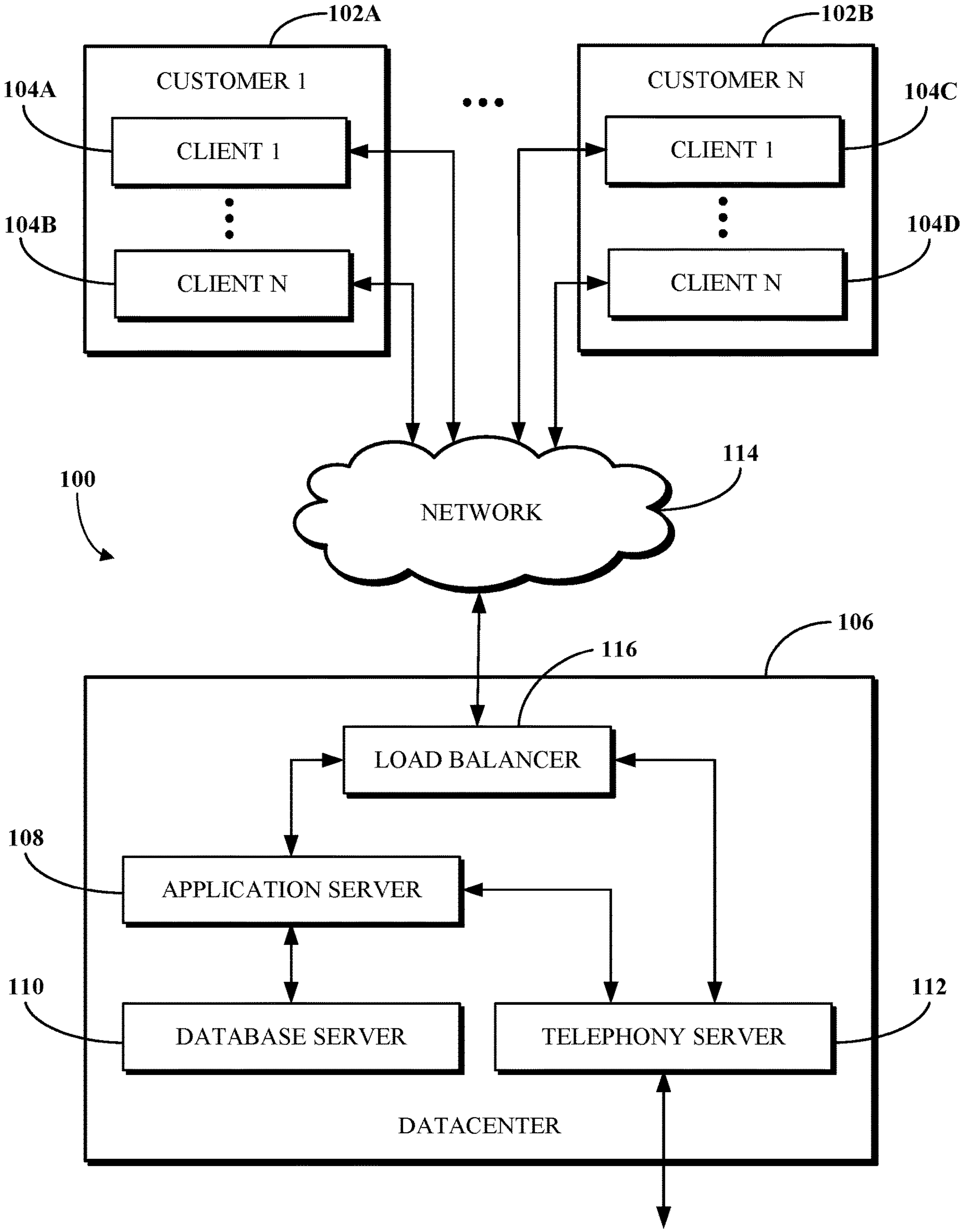
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Software platforms such as UCaaS platforms enable carriers, such as telephony carriers or PSTN carriers, to connect to a server of a software platform to provide PSTN services for customers of the software platform. The software platform supports multiple carriers and requires PSTN destined calls to traverse via the carriers for billing and logging purposes. Typically, when calls are traversing between users associated with different carriers over a software platform, the calls must traverse across several provider networks and make multiple trips through the software platform, all of which adds latency and creates opportunities for infrastructure failures affecting call quality and connection. In one example, the source of a call, a first user device of a software platform, is on a first carrier and the destination of the call, a second user device of the software platform, is on a second carrier. The call is first routed via the software platform to the first carrier, next from the first carrier to the second carrier, then from the second carrier back to the software platform, and finally to the destined second user device. The multiple hops in this situation increase the latency in the delivery of the call data from the first user device to the second user device, as well as potentially data exchanged once the call is answered at the second user device, and can thus provide for a poor user experience for all parties involved.

Implementations of this disclosure address problems such as these by maintaining a call between a first user device and a second user device on a software platform, thereby reducing the number of hops. The implementations disclosed herein intelligently recognize when user devices at both the source and destination of a given call are associated with a same software platform (e.g., a same UCaaS platform) and accordingly route a media and signaling portion of the call to the destination device via the software platform, while routing a call information portion to the respective carriers. In some implementations, the call information portion may be stored on the software platform and transmitted to the respective carriers at a later time. The call information portion is transmitted to the respective carriers to notify the respective carriers that a call has occurred, the duration of the call, and the disconnect reason codes (e.g., codes that indicates reasons for a call termination) to allow appropriate logging and/or billing of their respective customers while the call itself remains on the software platform infrastructure without being routed through the respective carriers. This feature reduces the number of hops, and thereby decreases the latency resulting in an improved user experience.

To describe some implementations in greater detail, reference is first made to examples of hardware and software structures used to implement on-network routing for inter-carrier calling. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a PSTN system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
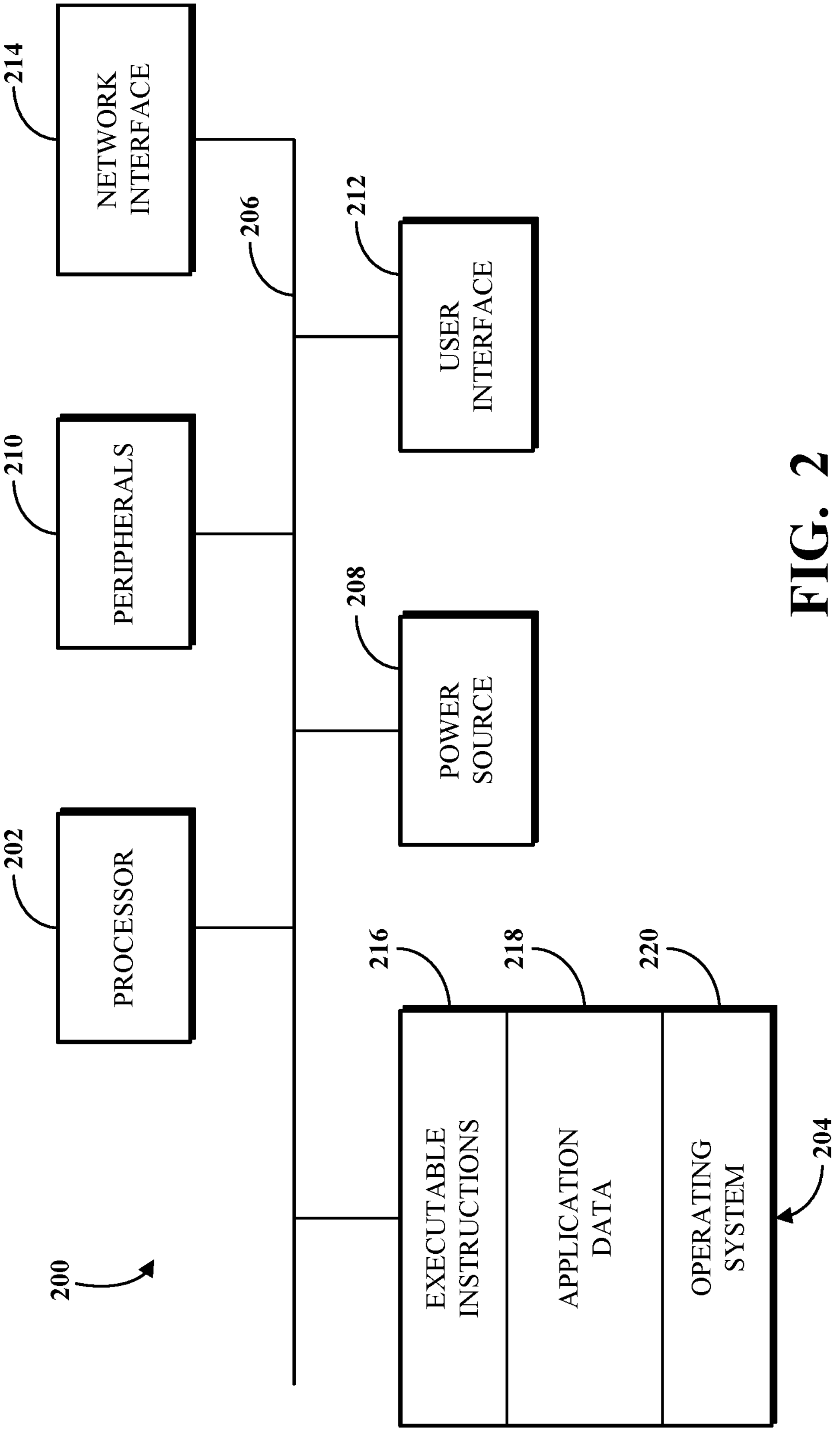
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
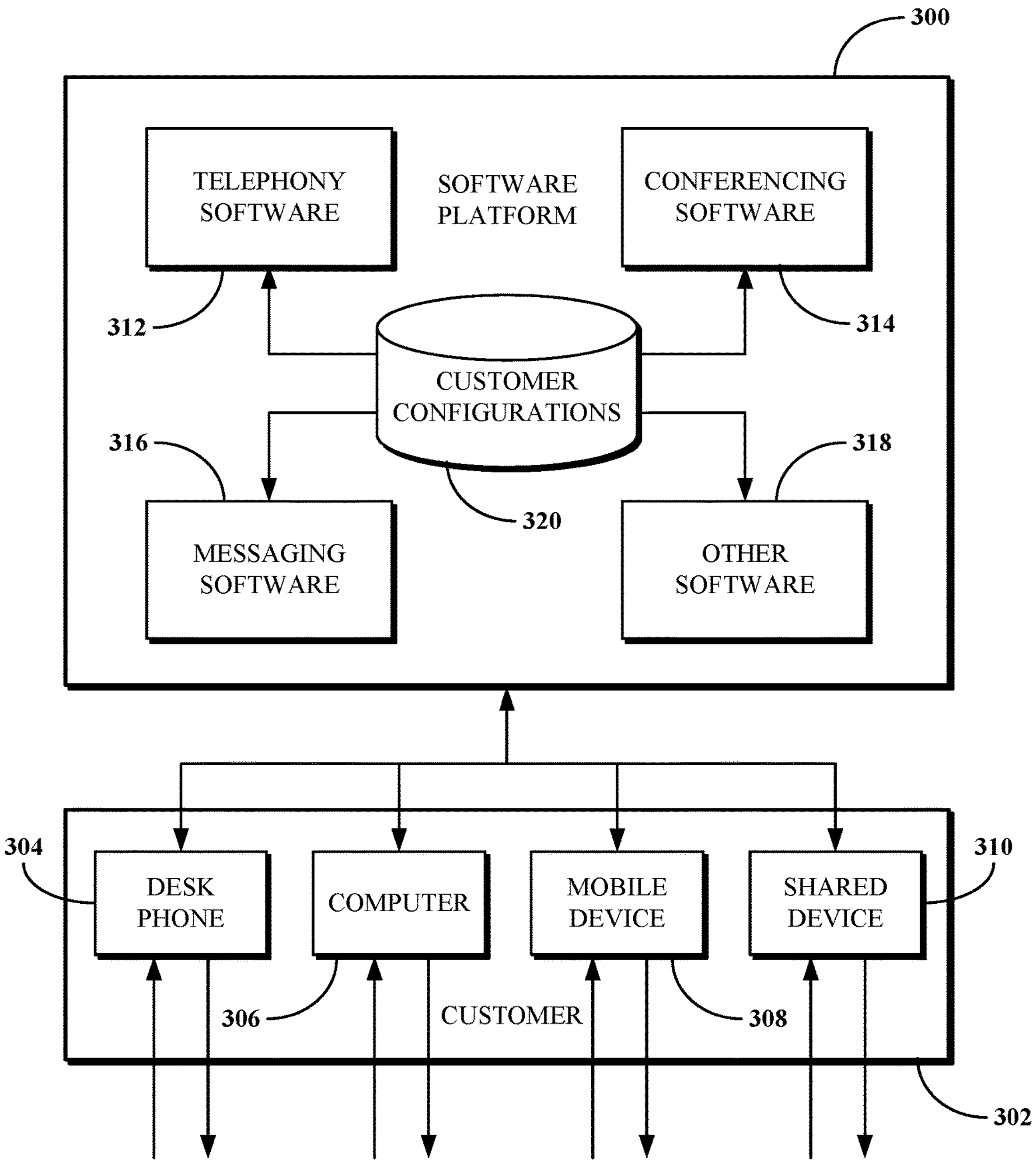
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include functionality for on-network call routing between user devices associated with different PSTN carriers.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
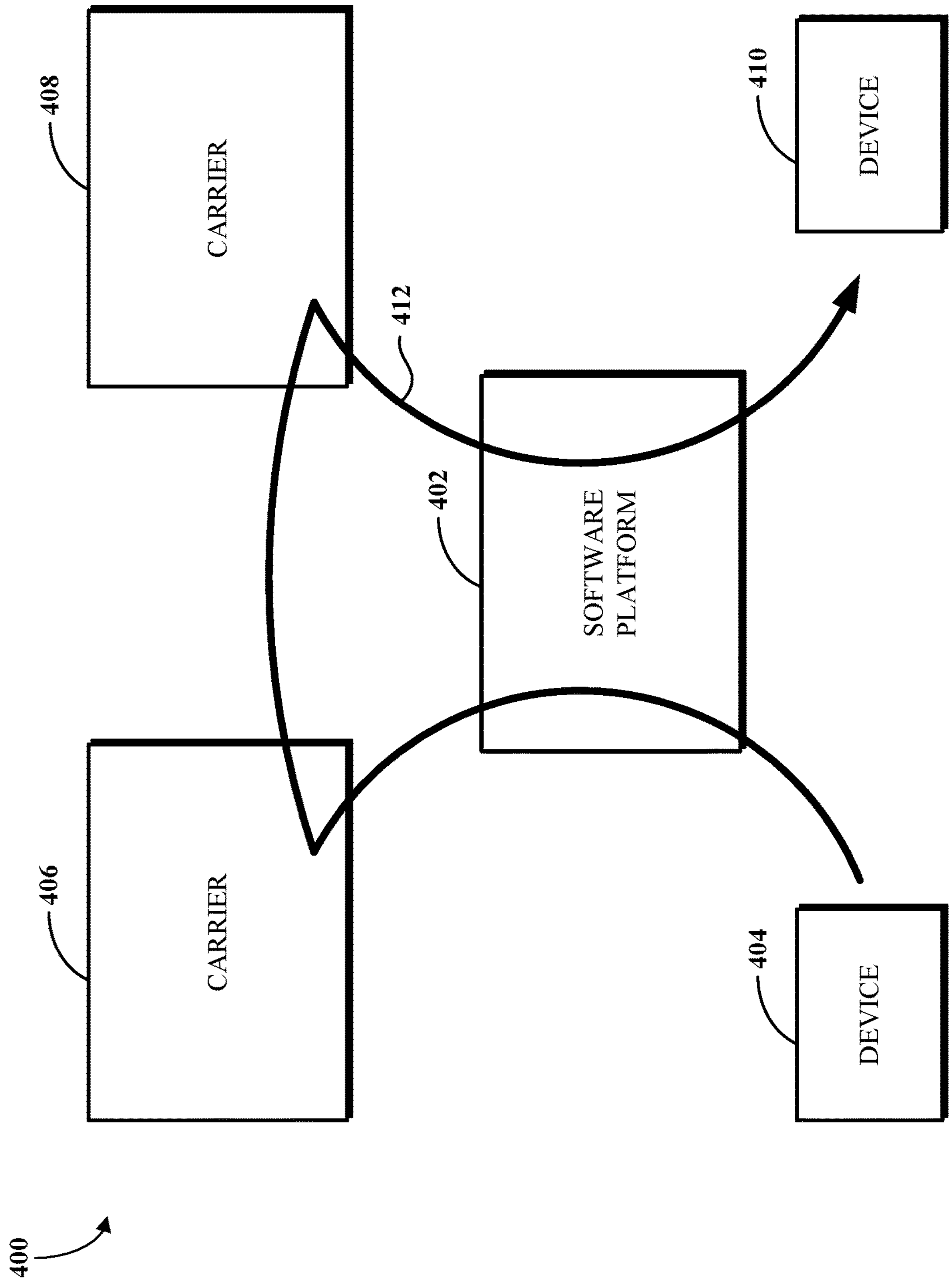
FIG. 4 is a block diagram of an example of a system for routing a call between devices associated with different PSTN carriers.

FIG. 4 is a block diagram of an example of a system 400 for routing a call between devices associated with different PSTN carriers. The system 400 includes a software platform 402, a first device 404, a first carrier 406, a second carrier 408, and a second device 410. The first carrier 406 provides a first PSTN infrastructure to deliver telephony services to the first device 404, and the second carrier 408 provides a second PSTN infrastructure to deliver telephony services to the second device 410. The software platform 402 may, for example, be the software platform 300 shown in FIG. 3.

The first device 404 is a client or other telephony-capable device configured to access server-side software (e.g., telephony software) available via the software platform 402. The first device 404 may, for example, be the desk phone 304, the computer 306, the mobile device 308, or the shared device 310 shown in FIG. 3. The first device 404 is associated with the software platform 402, for example, based on an account (e.g., a user account used with the server-side software) associated with the software platform 402 being logged into at the first device 404 or by the first device 404 being registered with the software platform 402 for use with the account. In the example shown, the first device 404 is a source device from which a call 412 is initiated. The first device 404 is also associated with the first carrier 406. In some implementations, a first service provider may use the PSTN infrastructure of the first carrier 406 to deliver telephony services to the first device 404.

The second device 410 is a client or other telephony-capable device configured to access the server-side software available via the software platform 402. The second device 410 may, for example, be the desk phone 304, the computer 306, the mobile device 308, or the shared device 310 shown in FIG. 3. Similar to the first device 404, the second device 410 may be associated with the software platform 402. In the example shown, the second device 410 is a destination device to which the call 412 is destined. The second device 410 is also associated with the second carrier 408. In some implementations, a second service provider may use the PSTN infrastructure of the second carrier 408 to deliver telephony services to the second device 410.

As shown in FIG. 4, and as previously mentioned, the first device 404 is the source device of the call 412 that is destined for the second device 410. The call 412 is routed from the first device 404 to the first carrier 406 via the software platform 402. The first carrier 406 routes the call 412 to the second carrier 408. The second carrier 408 then routes the call 412 to the second device 410 via the software platform 402. Intercarrier, digit-based routing is used to direct the call 412 between the first carrier 406 and the second carrier 408 using inter-carrier trunks based on digits that include country, national, and localized code prefixes. Direct inward dialing (DID) or direct dialing inward (DDI) numbers (e.g., contiguous numbers or an individual number)

indicate carrier ownership and may be noted in a database for queries. Based on the country, national, and localized code prefixes and DID/DDI numbers, the first carrier 406 queries its database to obtain another regional carrier exchange (e.g., the second carrier 408) through which to route the call 412.

Figure 5:
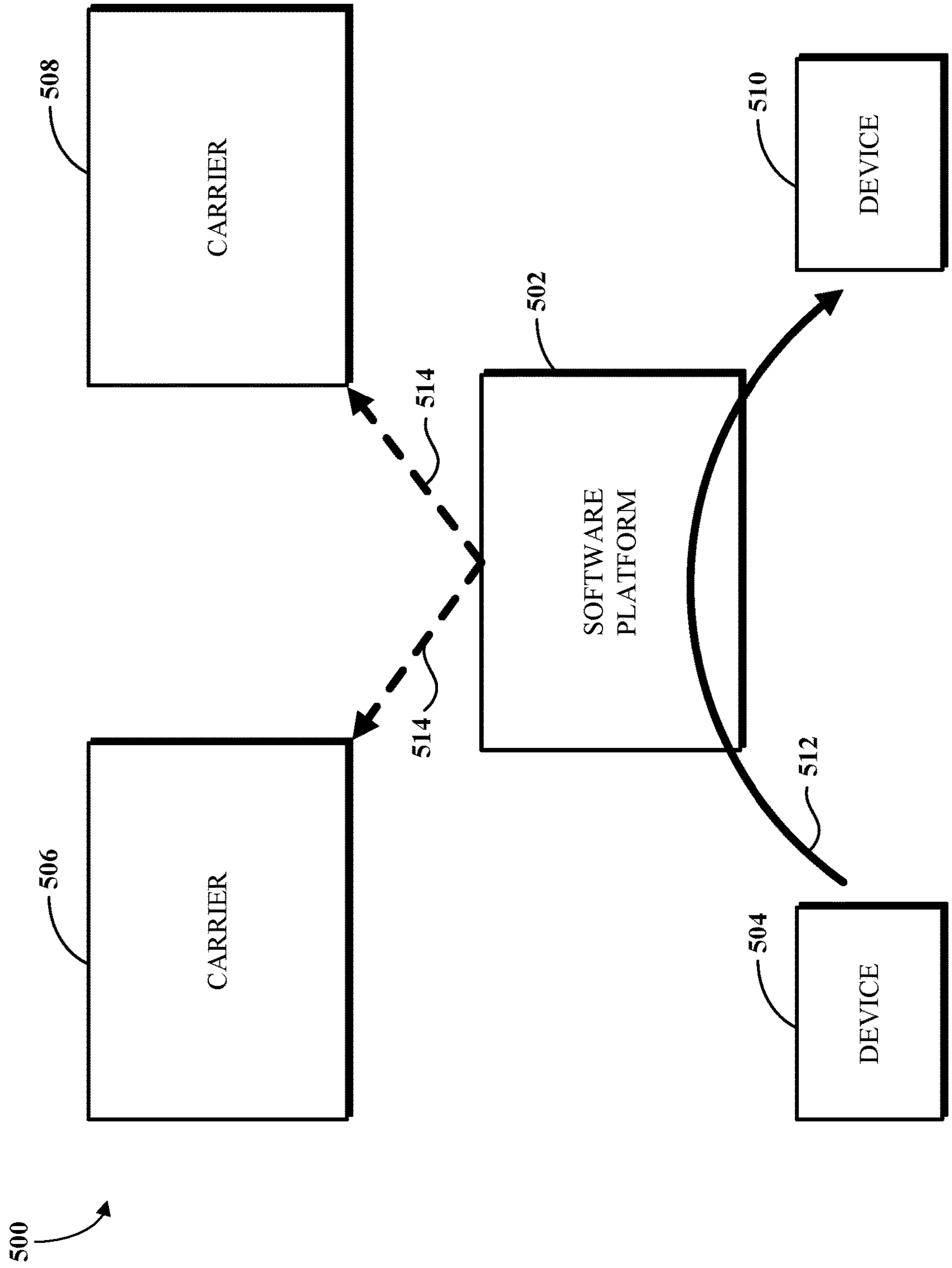
FIG. 5 is a block diagram of an example of a system for on-network call routing between devices associated with different PSTN carriers.

FIG. 5 is a block diagram of an example of a system 500 for on-network call routing between devices associated with different PSTN carriers. The system 500 includes a software platform 502, a first device 504, a first carrier 506, a second carrier 508, and a second device 510. The software platform 502 may be the software platform 300 shown in FIG. 3. The first device 504 may be the first device 404 shown in FIG. 4. The first carrier 506 may be the first carrier 406 shown in FIG. 4. The second carrier 508 may be the second carrier 408 shown in FIG. 4. The second device 510 may be the second device 410 shown in FIG. 4. The system 500 is configured to route calls solely through the software platform 502, without having to route the calls through the first carrier 506 and the second carrier 508.

As shown in FIG. 5, the first device 504 is the source device of a call that is destined for the second device 510. The first device 504 transmits call data 512 to the software platform 502. The software platform 502 is configured to determine, based on the call data 512, whether the first carrier 506 and the second carrier 508 support inter-carrier on-network routing. In order to support inter-carrier on-network routing, carriers such as the first carrier 506 and the second carrier 508 subscribe to an inter-carrier on-network routing feature of the software platform 502. By subscribing to the inter-carrier on-network routing feature, the carriers agree to receive call information, for example, for logging and billing purposes, and to have calls between devices on the same software platform be routed solely through the software platform.

The software platform 502 may detect whether an indicator, such as a flag, is enabled within the routing logic of the software platform 502 that causes the software platform 502 to determine whether the first carrier 506 and the second carrier 508 support inter-carrier on-network routing. The indicator may indicate that the first device 504 is associated with the first carrier 506. In response to detecting the indicator, the software platform determines whether the second device 510 is associated with a PSTN carrier, for example, using a look up table (LUT). The software platform 502 updates the LUT when the first device 504 and the second device 506 register with the software platform 502. The LUT is updated to include carrier information, such as a carrier identification (ID) for each device, an indicator of whether each carrier supports inter-carrier on-network routing, or both. The software platform 502 may obtain the carrier information from the first device 504, the second device 510, the first carrier 506, the second carrier 508, or any combination thereof. For example, the carrier information may be included in a signal transmitted by the first device 504, the second device 510, or both. Alternatively, the software platform 502 may obtain the carrier information from the first carrier 506, the second carrier 508, or both, for example, when the first device 504, the second device 510, or both, register with the software platform 502. In some implementations, the software platform 502 determines whether the first carrier 506 and the second carrier 508 support inter-carrier on-network routing based on the carrier information in the LUT. Based on a determination that the first carrier 506 and the second carrier 508 support inter-carrier on-network routing, the software platform 502 obtains a first portion 514 of the call data 512 and transmits the first portion 514 of the call data 512 to the first carrier 506 and the second carrier 508. The first portion 514 of the call data 512 may be transmitted upon conclusion of the call using an out-of-band communication. The out-of-band communication may include a transmission via an application programming interface (API) or webhook. The first portion 514 of the call data 512 is transmitted to enable the first carrier 506 to create a first call record and the second carrier 508 to create a second call record. The first and second call records are used by the respective carriers to log the call between the first device 504 and the second device 510 and for billing purposes. In some implementations, the first carrier 506 and the second carrier 508 receive the first portion 514 of the call data 512 via a webhook during call termination. In some implementations, the first carrier 506 and the second carrier 508 periodically receive the first portion 514 of the call data 512 as a portion of a bulk retrieval via an API. In an example where the first device 504 is associated with a first provider that uses the infrastructure of the first carrier 506 to provide service to the first device 504, the first carrier 506 is configured to transmit the first portion 514 of the call data 512 to the first provider. In an example where the second device 510 is associated with a second provider that uses the infrastructure of the second carrier 508 to provide service to the second device 510, the second carrier 508 is configured to transmit the first portion 514 of the call data 512 to the second provider.

The first portion 514 of the call data 512 includes call information. The call information may include post-call data, such as a first device ID, a second device ID, a date of call origination, a time of call origination, a date of call termination, a time of call termination, a call disconnect reason, or any combination thereof. Example call disconnect reasons can include a termination of the call by the first device 504 or the second device 510, a network error such as a failure at the first carrier 506 or a failure at the second carrier 508, a failure at the first device 504 or a failure at the second device 510, or a failure at the software platform 502. The call information can be stored within a call record or be used to generate a call record. The first device ID is an identification of a source device (e.g., first device 504), and the second device ID is an identification of a destination device (e.g., second device 510). The software platform 502 is configured to establish or maintain the call between the first device 504 and the second device 510 on the software platform 502 by transmitting a second portion of the call data 512 to the second device 510. The second portion of the call data 512 includes media information, signaling information, or both. The signaling information is associated with on-network calling and includes standard signaling to and from the second device 510. Media information may include information associated with a telephony call, a video call, a short message service (SMS) message, or another communication. By establishing or maintaining the call on the software platform 502, the call is not routed through the first carrier 506 or the second carrier 508. The call is routed by the software platform 502 using an international public telecommunication numbering plan, such as E.164. By establishing or maintaining the call on the software platform 502, the number of hops and opportunities for failure are reduced, thereby increasing routing efficiency by decreasing the latency of the call which results in an improved user experience. In addition, the first carrier 506 and the second carrier 508 receive the call information for logging and billing purposes without having to route the call, thereby saving bandwidth on their respective infrastructures and reducing operational costs through licensing savings.

The system 500 is shown with two carriers for exemplary purposes. The system 500 can be implemented with one carrier or three or more carriers. In an implementation where the system 500 has one carrier (e.g., the first device 504 and the second device 510 share the same carrier), herein referred to as a shared carrier, the first portion 514 of the call data 512 is transmitted to the shared carrier to enable the shared carrier to create a call record. In an implementation where the system 500 has three or more carriers, the first portion of the call data 512 is transmitted to each of the three or more carriers to enable each of the three or more carriers to create a call record.

In an example use case of the system 500 performing on-network call routing between devices associated with different PSTN carriers, the users of the first device 504 and the second device 510 may be associated with a common customer account of the software platform 502 (e.g., the users are co-workers). In this example, the software platform 502 updates the LUT to indicate that the first device 504 and the second device 510 are associated with the common customer account. When a call is made between the first device 504 and the second device 510, the software platform determines, based on the association of the first device 504 and the second device 510 to the common customer account, whether the first carrier 506 and the second carrier 508 support inter-carrier on-network routing. If it is determined that both the first carrier 506 and the second carrier 508 support inter-carrier on-network routing, the call is established or maintained on the software platform without being routed through the first carrier 506 and the second carrier 508.

In another example use case of the system 500 performing on-network call routing between devices associated with different PSTN carriers, the users of the first device 504 and the second device 510 may be associated with different accounts of the software platform 502 (e.g., the users have individual accounts). In this example, the software platform 502 updates the LUT to indicate that the first device 504 is associated with a first account and the second device 510 is associated with a second account. The first and second accounts are both associated with the software platform 502. When a call is made between the first device 504 and the second device 510, the software platform determines, based on the association of the first account of the first device 504 being associated with the software platform 502 and the second account of the second device 510 being associated with the software platform 502, whether the first carrier 506 and the second carrier 508 support inter-carrier on-network routing. If it is determined that both the first carrier 506 and the second carrier 508 support inter-carrier on-network routing, the call is established or maintained on the software platform without being routed through the first carrier 506 and the second carrier 508.

Figure 6:
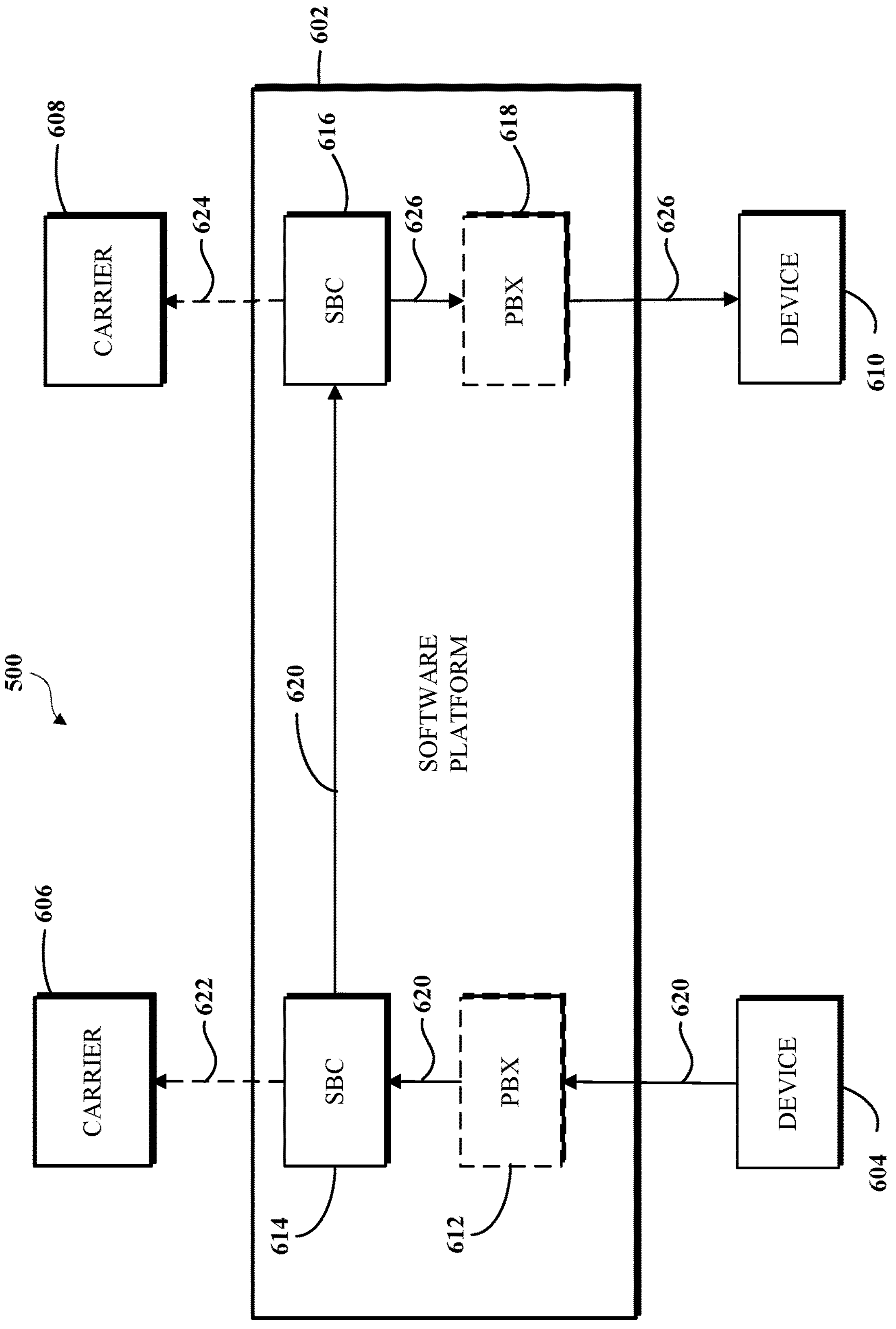
FIG. 6 is a block diagram of an example of the system shown in FIG. 5 illustrating an on-network call routing flow via the software platform.

FIG. 6 is a block diagram of an example of the system 500 shown in FIG. 5 illustrating an on-network call routing flow via the software platform. The system 500 includes a software platform 602, a first device 604, a first carrier 606, a second carrier 608, and a second device 610. The software platform 602 includes a PBX 612, a SBC 614, a SBC 616, and a PBX 618. The PBX 612 and SBC 614 may be associated with the first carrier 606. The SBC 616 and PBX 618 is associated with the second carrier 608. In some examples, the PBX 612 and the PBX 618 may be combined as a single PBX.

As shown in FIG. 6, the first device 604 is the source device of a call that is destined for the second device 610. The first device 604 transmits call data 620 to the PBX 612. In an implementation, the PBX 612 is configured to determine, based on the call data 620, whether the first carrier 606 and the second carrier 608 support inter-carrier on-network routing. In some examples, the PBX 612 may use a LUT to determine whether the first carrier 606 and the second carrier 608 support inter-carrier on-network routing. The PBX 612 is configured to transmit the call data 620 to the SBC 614. Based on a determination that the first carrier 606 and the second carrier 608 support inter-carrier on-network routing, the SBC 614 obtains a portion of the call data 620 and transmits the obtained portion 622 of the call data 620 to the first carrier 606. The SBC 614 is configured to transmit the call data 620 to the SBC 616. The SBC 616 obtains a portion of the call data 620 and transmits the obtained portion 624 of the call data 620 to the second carrier 608. The obtained portions 622 and 624 of the call data 620 include call information. The call information may include a first device ID, a second device ID, a date of call origination, a time of call origination, a date of call termination, a time of call termination, a call disconnect reason, or any combination thereof. The first device ID is an identification of a source device (e.g., first device 604), and the second device ID is an identification of a destination device (e.g., second device 610). The obtained portions 622 and 624 of the call data 620 may be transmitted upon conclusion of the call using an out-of-band communication. The out-of-band communication may include a transmission via an API or webhook. The SBC 616 is configured to maintain the call between the first device 604 and the second device 610 on the software platform 602 by transmitting a second portion 626 of the call data 620 to the second device 610 via the PBX 618. The second portion 626 of the call data 620 includes media and signaling information. The software platform 602 is configured to maintain the call between the first device 604 and the second device 610 on the software platform by transmitting the second portion 626 of the call data 620 to the second device 610. By maintaining the call on the software platform 602, the call is not routed through the first carrier 606 or the second carrier 608.

Figure 7:
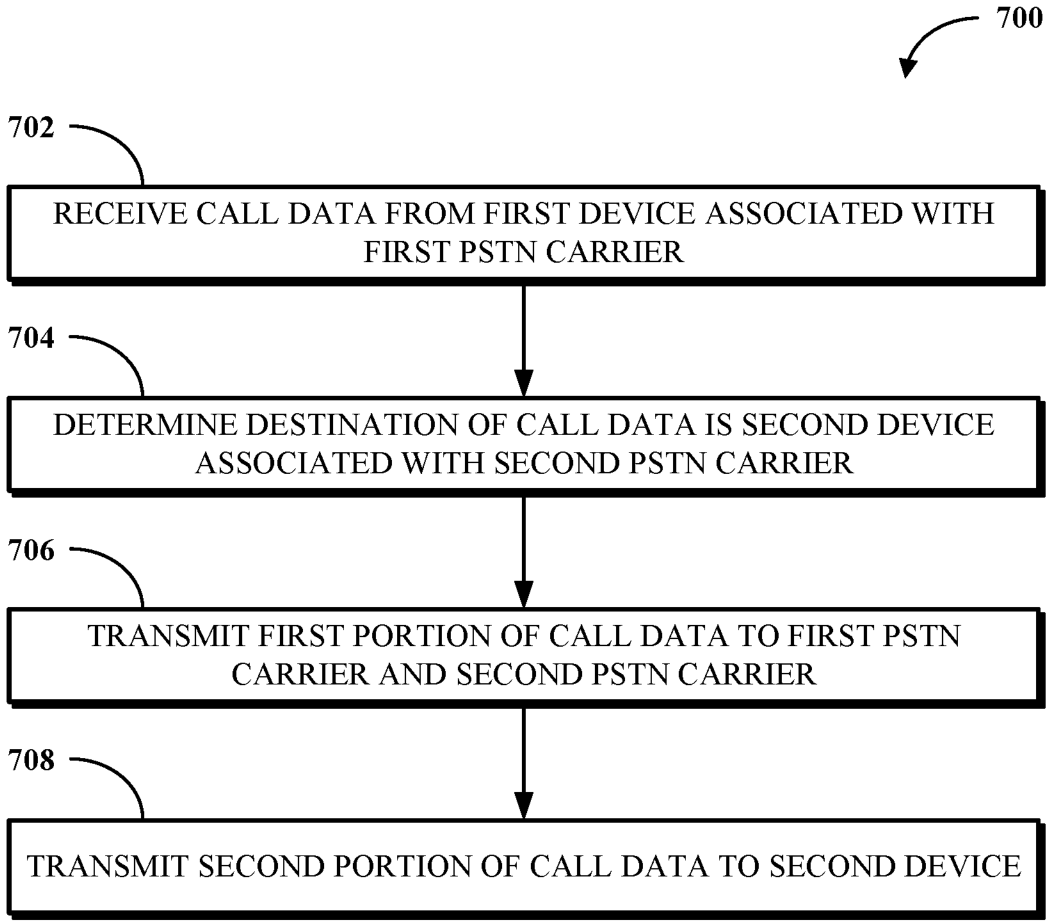
FIG. 7 is a flow diagram of an example of a method for on-network call routing between devices associated with different PSTN carriers.
Figure 8:
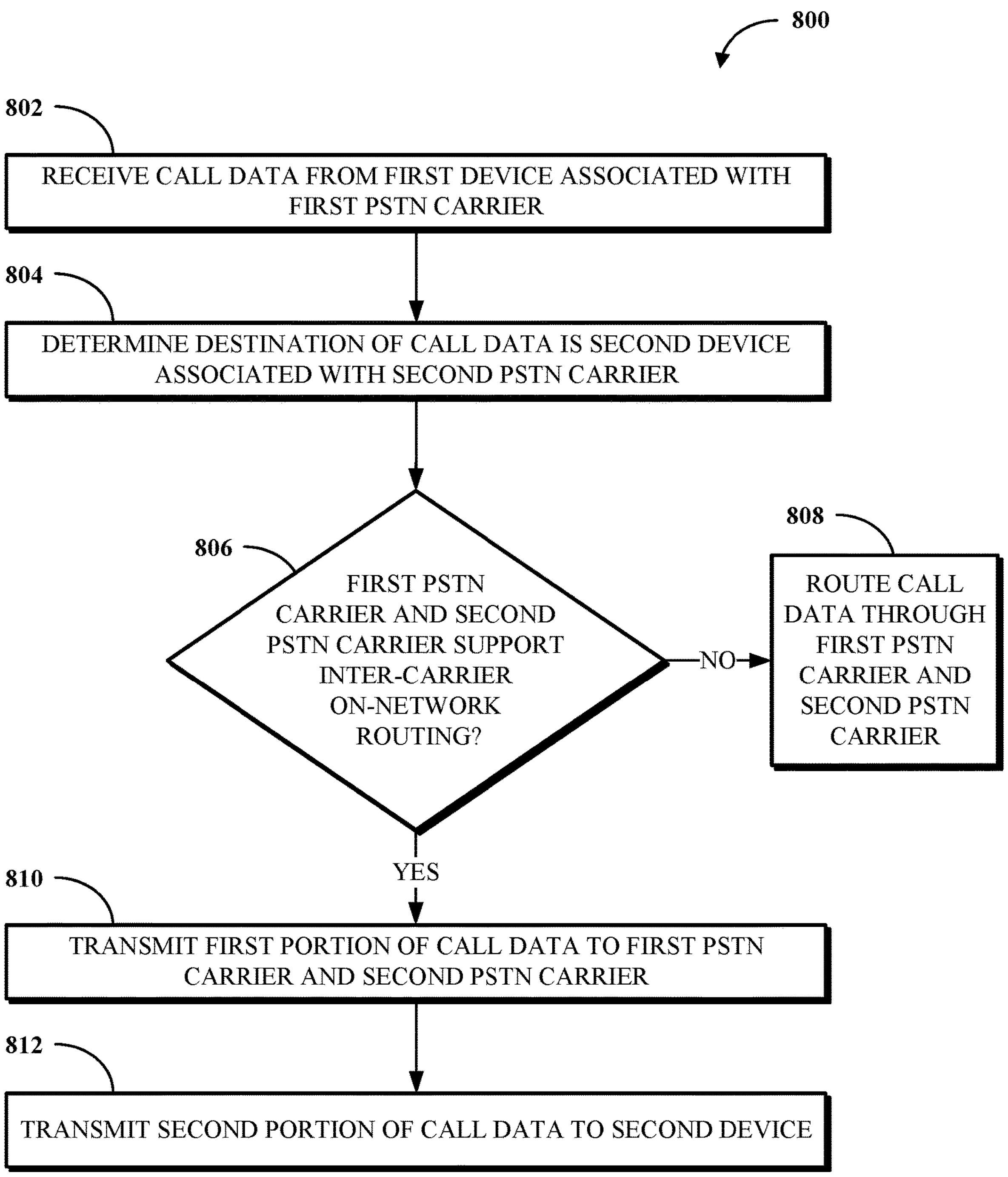
FIG. 8 is a flowchart of another example of a method for on-network call routing between devices associated with different PSTN carriers.

To further describe some implementations in greater detail, reference is next made to examples of techniques which may be performed by or using a system for on-network call routing between devices associated with different PSTN carriers. FIGS. 7 and 8 are flowcharts of example methods for on-network call routing between devices associated with different PSTN carriers. The methods can be executed using computing devices, such as the systems, hardware, and software described with respect to FIGS. 1-6. The methods can be performed, for example, by executing a machine-readable program or other computer-executable instructions, such as routines, instructions, programs, or other code. The steps, or operations, of the methods or other techniques, methods, processes, or algorithms described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 7 is a flow diagram of an example of a method 700 for on-network call routing between devices associated with different PSTN carriers. At 702, the method 700 includes receiving call data from a first device associated with a first PSTN carrier. The first device may also be associated with a software platform.

At 704, the method 700 includes determining that the destination of the call data is a second device associated with the PSTN carrier. The second device may also be associated with the software platform, i.e., the same software platform with which the first device is associated.

At 706, the method 700 includes transmitting a first portion of the call data to the first PSTN carrier and the second PSTN carrier. The first portion of the call data may be transmitted upon conclusion of the call using an out-of-band communication. The out-of-band communication may include a transmission via an API or a webhook. Transmission of the first portion of the call data to the first PSTN carrier and the second PSTN carrier are based on a determination that the first device and the second device are both associated with the software platform. The first portion of the call data may include post-call data, such as a first device ID, a second device ID, a date of call origination, a time of call origination, a date of call termination, a time of call termination, a call disconnect reason, or any combination thereof. The first portion of the call data is usable by a carrier to generate a call record. In some implementations, the software platform uses the first portion of the call data to generate and store a call record.

At 708, the method 700 includes transmitting a second portion of the call data to the second device to establish or maintain a call between the first device and the second device on the software platform. By maintaining the call on the software platform, the call is routed through the software platform itself, and is not routed through the first carrier or the second carrier. Transmission of the second portion of the call data to the second device is based on the first device and the second device both being associated with the software platform. The second portion of the call data may include media information, signaling information, or both.

FIG. 8 is a flowchart of another example of a method 800 for on-network call routing between devices associated with different PSTN carriers. At 802, the method 800 includes receiving a call data from a first device. The first device may be associated with a first PSTN carrier. The first device may also be associated with a software platform.

At 804, the method 800 includes determining that the destination of the call data is a second device associated with the PSTN carrier. The destination of the call data may be determined based on the call data. For example, the call data may include a device ID or a device address. The second device may also be associated with the software platform, i.e., the same software platform with which the first device is associated.

At 806, the method 800 includes determining whether the first PSTN carrier and the second PSTN carrier support inter-carrier on-network routing. In an example, the determination of whether the first PSTN carrier and the second PSTN carrier support inter-carrier on-network routing may be based on the enablement of an indicator, such as a flag, in the routing logic of the software platform. The flag may be used to indicate carrier support of inter-carrier on-network routing, indicate that a carrier has not excluded a number from participating in inter-carrier on-network routing, or both. An example where the flag indicates that a carrier has not excluded a number from participating may be a case where there is a lawful intercept to exclude a given number from inter-carrier on-network routing. In this example, a carrier may be required to carry both the signaling and media traffic for the given number. If that number was flagged for any reason by the carrier, the call would be routed through the carrier.

If the flag is not enabled, a determination is made that the first PSTN carrier and the second PSTN carrier do not support inter-carrier on-network routing. At 808, based on the determination that the first PSTN carrier or the second PSTN carrier do not support inter-carrier on-network routing, the call data is routed through the first PSTN carrier and the second PSTN carrier.

If the flag is enabled, a determination is made that the first PSTN carrier and the second PSTN carrier support inter-carrier on-network routing. At 810, based on the determination that the first PSTN carrier and the second PSTN carrier support inter-carrier on-network routing, a first portion of the call data is transmitted to the first PSTN carrier and the second PSTN carrier. The first portion of the call data may include call record information, such as, for example, a first device ID, a second device ID, a date of call origination, a time of call origination, a date of call termination, a time of call termination, a call disconnect reason, or any combination thereof. Transmission of the first portion of the call data to the first PSTN carrier and the second PSTN carrier are based on the first device and the second device both being associated with the software platform.

At 812, a second portion of the call data is transmitted to a second device to establish or maintain a call between the first device and the second device on the software platform. By establishing or maintaining the call on the software platform, the call is routed through the software platform itself, and is not routed through the first carrier or the second carrier. The call is routed by the software platform using an international public telecommunication numbering plan, such as E.164. The second portion of the call data may include media information, signaling information, or both. The second portion of the call data is transmitted to the second device based on the determination that the first PSTN carrier and the second PSTN carrier support inter-carrier on-network routing. Transmission of the second portion of the call data to the second device may also be based on the first device and the second device both being associated with the software platform.

In an aspect, a method may include receiving call data from a first device associated with a first PSTN carrier and a software platform. The method may include determining that a destination of the call data is a second device associated with a second PSTN carrier and the software platform. The method may include, based on the first device and the second device both being associated with the software platform, transmitting a first portion of the call data to the first PSTN carrier and the second PSTN carrier. The first portion of the call data may include call record information. The method may include, based on the first device and the second device both being associated with the software platform, transmitting a second portion of the call data to the second device. The second portion of the call data may include media and signaling information.

In an aspect, a system may include a first device, a second device, and a software platform. The first device may be associated with a first PSTN carrier. The second device may be associated with a second PSTN carrier. The software platform may be configured to receive call data from the first device. The software platform may be configured to determine that a destination of the call data is the second device. The software platform may be configured to determine that the first device and the second device are associated with the software platform. The software platform may be configured to transmit a first portion of the call data to the first PSTN carrier and the second PSTN carrier. The first portion of the call data may include call record information. The software platform may be configured to transmit a second portion of the call data to the second device. The second portion of the call data may include media and signaling information.

In another aspect, a non-transitory computer-readable medium may include stored instructions that when executed by a processor, cause the processor to perform one or more operations. The operations may include receiving call data from a first device associated with a first PSTN carrier and a software platform. The operations may include determining that a destination of the call data is a second device associated with a second PSTN carrier and the software platform. The operations may include, based on the first device and the second device both being associated with the software platform, transmitting a first portion of the call data to the first PSTN carrier and the second PSTN carrier. The first portion of the call data may include call record information. The operations may include, based on the first device and the second device both being associated with the software platform, transmitting a second portion of the call data to the second device. The second portion of the call data may include media and signaling information.

In one or more aspects, the method may include determining whether the first PSTN carrier and the second PSTN carrier support inter-carrier on-network routing. In one or more aspects, the determination of whether the first PSTN carrier and the second PSTN carrier support inter-carrier on-network routing is based on an enablement of a flag in a routing logic of the software platform. In one or more aspects, the method may include maintaining a call between the first device and the second device on the software platform. In one or more aspects, the method may include obtaining inter-carrier on-network routing support information from a LUT to determine whether the first PSTN carrier and the second PSTN carrier support inter-carrier on-network routing. In one or more aspects, the call record information may include at least one of a first device ID, a second device ID, a date of call origination, a time of call origination, a date of call termination, a time of call termination, or a call disconnect reason. In one or more aspects, the first device may be associated with a provider that is configured to use an infrastructure of the first PSTN carrier to provide service to the first device.

In one or more aspects, the software platform is configured to determine whether the first PSTN carrier and the second PSTN carrier support inter-carrier on-network routing. In one or more aspects, the software platform may be configured to determine whether the first PSTN carrier and the second PSTN carrier support inter-carrier on-network routing based on an enablement of a flag in a routing logic of the software platform. In one or more aspects, the software platform may be configured to maintain a call between the first device and the second device on the software platform. In one or more aspects, the software platform may be configured to obtain inter-carrier on-network routing support information from a LUT to determine whether the first PSTN carrier and the second PSTN carrier support inter-carrier on-network routing.

In one or more aspects, the processor may perform operations including determining whether the first PSTN carrier and the second PSTN carrier support inter-carrier on-network routing. In one or more aspects, the processor may determine whether the first PSTN carrier and the second PSTN carrier support inter-carrier on-network routing based on an enablement of a flag in a routing logic of the software platform. In one or more aspects, the processor may perform operations including maintaining a call between the first device and the second device on the software platform. In one or more aspects, the processor may perform operations including obtaining inter-carrier on-network routing information from a LUT to determine whether the first PSTN carrier and the second PSTN carrier support inter-carrier on-network routing.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

receiving call data from a first device associated with a first public switched telephone network (PSTN) carrier and a software platform;

determining that a destination of the call data is a second device associated with a second PSTN carrier and the software platform; and based on the first device and the second device both being associated with the software platform via registrations to a same multi-tenant unified communications as a service (UCaaS) customer account:

determining on-network routing based on device registration and carrier support flags;

transmitting, from the software platform, a first portion of the call data to the first PSTN carrier and the second PSTN carrier, wherein the first portion of the call data includes call record information; and transmitting, from the software platform, a second portion of the call data to the second device, wherein the second portion of the call data includes media and signaling information.

2. The method of claim 1, further comprising:

determining whether the first PSTN carrier and the second PSTN carrier both support inter-carrier on-network routing.

3. The method of claim 2, wherein the determination of whether the first PSTN carrier and the second PSTN carrier support inter-carrier on-network routing is based on an enablement of a flag in a routing logic of the software platform.

4. The method of claim 1, further comprising:

maintaining a call between the first device and the second device on the software platform.

5. The method of claim 1, further comprising:

obtaining inter-carrier on-network routing support information from a look up table to determine whether the first PSTN carrier and the second PSTN carrier both support inter-carrier on-network routing.

6. The method of claim 1, wherein the call record information includes at least one of a first device identification (ID), a second device ID, a date of call origination, a time of call origination, a date of call termination, a time of call termination, or a call disconnect reason.

7. The method of claim 1, wherein the first device is associated with a provider that is configured to use an infrastructure of the first PSTN carrier to provide service to the first device.

8. A system comprising:

a first device associated with a first public switched telephone network (PSTN) carrier;

a second device associated with a second PSTN carrier; and a software platform configured to:

receive call data from the first device;

determine that a destination of the call data is the second device;

determine that the first device and the second device are associated with the software platform via registrations to a same multi-tenant unified communications as a service (UCaaS) customer account;

determine on-network routing based on device registration and carrier support flags;

transmit a first portion of the call data to the first PSTN carrier and the second PSTN carrier, wherein the first portion of the call data includes call record information; and transmit a second portion of the call data to the second device, wherein the second portion of the call data includes media and signaling information.

9. The system of claim 8, wherein the software platform is further configured to:

determine whether the first PSTN carrier and the second PSTN carrier both support inter-carrier on-network routing.

10. The system of claim 9, wherein the software platform is configured to determine whether the first PSTN carrier and the second PSTN carrier support inter-carrier on-network routing based on an enablement of a flag in a routing logic of the software platform.

11. The system of claim 8, wherein the software platform is further configured to:

maintain a call between the first device and the second device on the software platform.

12. The system of claim 8, wherein the software platform is further configured to:

obtain inter-carrier on-network routing support information from a look up table to determine whether the first PSTN carrier and the second PSTN carrier both support inter-carrier on-network routing.

13. The system of claim 8, wherein the call record information includes at least one of a first device identification (ID), a second device ID, a date of call origination, a time of call origination, a date of call termination, a time of call termination, or a call disconnect reason.

14. The system of claim 8, wherein the first device is associated with a provider that is configured to use an infrastructure of the first PSTN carrier to provide service to the first device.

15. A non-transitory computer-readable medium comprising stored instructions that when executed by a processor, cause the processor to perform operations comprising:

receiving call data from a first device associated with a first public switched telephone network (PSTN) carrier and a software platform;

determining that a destination of the call data is a second device associated with a second PSTN carrier and the software platform; and based on the first device and the second device both being associated with the software platform via registrations to a same multi-tenant unified communications as a service (UCaaS) customer account:

determining on-network routing based on device registration and carrier support flags;

transmitting, from the software platform, a first portion of the call data to the first PSTN carrier and the second PSTN carrier, wherein the first portion of the call data includes call record information; and transmitting, from the software platform, a second portion of the call data to the second device, wherein the second portion of the call data includes media and signaling information.

16. The non-transitory computer-readable medium of claim 15, wherein the processor performs operations further comprising:

determining whether the first PSTN carrier and the second PSTN carrier both support inter-carrier on-network routing.

17. The non-transitory computer-readable medium of claim 16, wherein the determination of whether the first PSTN carrier and the second PSTN carrier support inter-carrier on-network routing is based on an enablement of a flag in a routing logic of the software platform.

18. The non-transitory computer-readable medium of claim 15, wherein the processor performs operations further comprising:

maintaining a call between the first device and the second device on the software platform.

19. The non-transitory computer-readable medium of claim 15, wherein the processor performs operations further comprising:

obtaining inter-carrier on-network routing support information from a look up table to determine whether the first PSTN carrier and the second PSTN carrier both support inter-carrier on-network routing.

20. The non-transitory computer-readable medium of claim 15, wherein the call record information includes at least one of a first device identification (ID), a second device ID, a date of call origination, a time of call origination, a date of call termination, a time of call termination, or a call disconnect reason.

* * * * *